(12) United States Patent
Buchan et al.

(10) Patent No.: US 12,174,988 B2
(45) Date of Patent: Dec. 24, 2024

(54) SYSTEM AND METHOD FOR MANAGING TRANSPARENT DATA ENCRYPTION OF DATABASE

(71) Applicant: WORLDR TECHNOLOGIES LIMITED, Slough (GB)

(72) Inventors: Maximilian Alastair Buchan, Slough (GB); Dzmitry Maskaliou, Slough (GB); Michael Antipin, Slough (GB); Yann Golanski, Slough (GB)

( * ) Notice: Subject to any disclaimer, the term of this patent is extended or adjusted under 35 U.S.C. 154(b) by 0 days.

(21) Appl. No.: 17/857,781

(22) Filed: Jul. 5, 2022

(65) Prior Publication Data

US 2023/0004671 A1     Jan. 5, 2023

(30) Foreign Application Priority Data

Jul. 2, 2021 (GB) ..................................... 2109573

(51) Int. Cl.
    *G06F 21/62* (2013.01)
(52) U.S. Cl.
    CPC ................................ *G06F 21/6227* (2013.01)
(58) Field of Classification Search
    CPC .................................................. G06F 21/6227
    USPC ......................................................... 707/783
    See application file for complete search history.

(56) References Cited

U.S. PATENT DOCUMENTS

| | | | |
|---|---|---|---|
| 10,592,685 B2 * | 3/2020 | Yeo | H04L 63/0435 |
| 10,783,270 B2 * | 9/2020 | Ithal | H04L 9/0825 |
| 11,636,223 B2 * | 4/2023 | Pai | H04L 9/088 |
| | | | 713/164 |
| 2008/0263363 A1 * | 10/2008 | Jueneman | H04L 9/0877 |
| | | | 713/184 |
| 2010/0290623 A1 * | 11/2010 | Banks | G06F 21/6227 |
| | | | 707/E17.005 |
| 2018/0137302 A1 * | 5/2018 | Crimm | H04L 9/088 |
| 2019/0042759 A1 * | 2/2019 | Smith | G06F 21/74 |
| 2022/0414261 A1 * | 12/2022 | Thapar | G06F 21/602 |

\* cited by examiner

*Primary Examiner* — Joshua Bullock
(74) *Attorney, Agent, or Firm* — RC Trademark Company

(57) ABSTRACT

Disclosed is a system for managing transparent data encryption of a database. The system comprises an encrypted vault application and an application server. The encrypted vault application stores at least one encryption key for the database. The application server is configured to provide an authorization token to the encrypted vault application after unsealing of the encrypted vault application; receive an access token from the encrypted vault application, after authentication of the application server; provide the access token to the encrypted vault application to receive at least one encryption key therefrom; and communicate the at least one encryption key, via a key talker, to the database; and wherein the database comprises a key listener that listens for the at least one encryption key and provides the at least one encryption key to the database.

11 Claims, 2 Drawing Sheets

SYSTEM AND METHOD FOR MANAGING TRANSPARENT DATA ENCRYPTION OF DATABASE

TECHNICAL FIELD

The present disclosure relates generally to data encryption and security; and more specifically, to methods and systems for managing transparent data encryption of databases.

BACKGROUND

Nowadays, in an organization of any size, ensuring that protective measures to keep any unauthorized access out of their databases, websites and computers, are of utmost importance. Furthermore, in today's data driven environments, data has become a primary asset found at the core of most business operations and decisions. Notably, databases are encrypted in order to encode data and to render it unintelligible to someone who does not have the authorization to access the data. Typically, once data is encrypted, only authorized users who possess an encryption key to access the database may read or use the data. Furthermore, the encryption key may be stored in a vault to provide another layer of security. Additionally, application servers connect the database with authorized user, wherein the application server controls the data flow for better performance, and provides security to the data. Consequently, in case the encryption method is effective, there is complete protection of data from security threats and data breaches. However, even after using adequate encryption methods for securing the database, there are still issues in keeping the data safe.

Conventionally, the databases would open by using only one encryption key. The database requesting for the encryption key might attract unwanted attention from attackers. Moreover, the encryption key itself acted as a validator, and there was no authentication of the user seeking for data from the database using the encryption key. Therefore, in case the encryption key was in the possession of attackers, there was no way to stop them or take any action preemptively. Additionally, only one administrator key was sufficient to enter the vault, which may lead to a data breach in case the one administrator key is with the attacker. Typically, the database would request for the encryption key, thus signaling the attackers and exposing the database to a possible attack. Furthermore, the encryption key was stored by the application server. Therefore, any attacker having compromised either the database, or the application server or both thereof, will have access to the encryption key and pose a threat to the security of the organization.

In recent times, secure isolated regions or trusted execution environments are developed to provide a secure container, referred to as an enclave herein, containing data or/and software in memory and hardware. However, the enclaves potentially contain data or/and software alongside untrusted regions, and shares resources with untrusted entities. Furthermore, attestation may be used to verify to an authorized user that the application server and the database are trustworthy. However, in case the data is breached, the authorized user will blindly trust the verification provided by the attestation, and get risked being attacked. Furthermore, Key Vault is used for storing the encryption key. However, only one version of the Key Vault is available and is not suitable for organizations of different sizes.

Therefore, in light of the foregoing discussion, there exists a need to overcome the aforementioned drawbacks associated with data encryption and security.

SUMMARY

The present disclosure seeks to provide a system for managing transparent data encryption of a database. The present disclosure also seeks to provide a method for managing transparent data encryption of a database. An aim of the present disclosure is to provide a solution that overcomes at least partially the problems encountered in prior art.

In one aspect, the present disclosure provides a system for managing transparent data encryption of a database, the system comprising
   an encrypted vault application for storing at least one encryption key for the database, wherein the encrypted vault application requires a plurality of administrator keys for unsealing thereof; and
   an application server configured to:
      provide an authorization token to the encrypted vault application after unsealing of the encrypted vault application, wherein the authorization token is characteristic to the application server and is used for authentication of the application server;
      receive an access token from the encrypted vault application, after authentication of the application server;
      provide the access token to the encrypted vault application to receive at least one encryption key therefrom; and
      communicate the at least one encryption key, via a key talker, to the database; and wherein the database comprises a key listener that listens for the at least one encryption key and provides the at least one encryption key to the database.

In another aspect, the present disclosure provides a method for managing transparent data encryption of a database, wherein the method is implemented using a system comprising
   an encrypted vault application for storing at least one encryption key for the database, wherein the encrypted vault application requires a plurality of administrator keys for unsealing thereof; and
   an application server;
wherein the method comprises
   providing an authorization token to the encrypted vault application after unsealing of the encrypted vault application, wherein the authorization token is characteristic to the application server and is used for authentication of the application server;
   receiving an access token from the encrypted vault application, after authentication of the application server;
   provide the access token to the encrypted vault application to receive at least one encryption key therefrom; and
   communicating the at least one encryption key, via a key talker, to the database; and wherein the database comprises a key listener that listens for the at least one encryption key and provides the at least one encryption key to the database.

Embodiments of the present disclosure substantially eliminate or at least partially address the aforementioned problems in the prior art, and enables secure transparent data encryption of the database.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
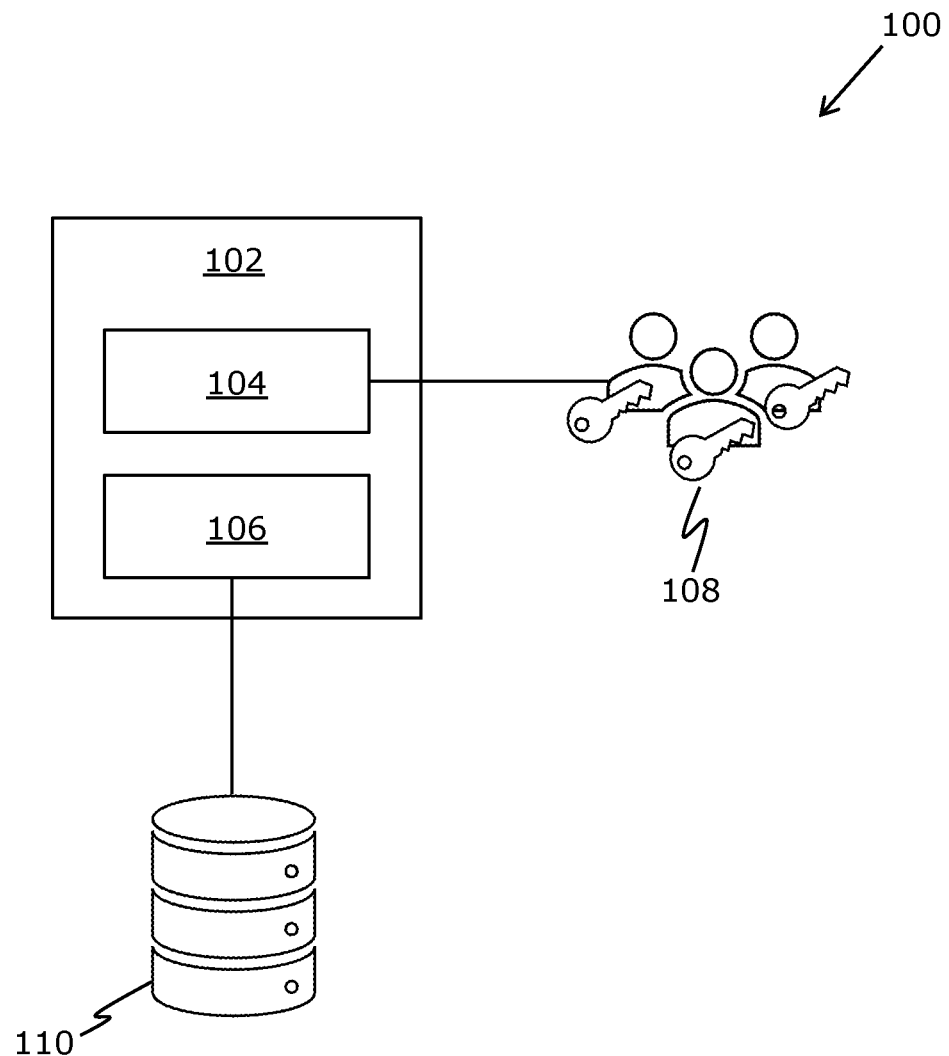
FIG. 1 illustrates a block diagram depicting a network environment in which a system for managing transparent data encryption of a database is implemented, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, the present disclosure provides a system for managing transparent data encryption of a database, the system comprising
 an encrypted vault application for storing at least one encryption key for the database, wherein the encrypted vault application requires a plurality of administrator keys for unsealing thereof; and
 an application server configured to:
  provide an authorization token to the encrypted vault application after unsealing of the encrypted vault application, wherein the authorization token is characteristic to the application server and is used for authentication of the application server;
  receive an access token from the encrypted vault application, after authentication of the application server;
  provide the access token to the encrypted vault application to receive at least one encryption key therefrom; and
  communicate the at least one encryption key, via a key talker, to the database; and wherein the database comprises a key listener that listens for the at least one encryption key and provides the at least one encryption key to the database.

In another aspect, the present disclosure provides a method for managing transparent data encryption of a database, wherein the method is implemented using a system comprising
 an encrypted vault application for storing at least one encryption key for the database, wherein the encrypted vault application requires a plurality of administrator keys for unsealing thereof; and
 an application server;
wherein the method comprises
 providing an authorization token to the encrypted vault application after unsealing of the encrypted vault application, wherein the authorization token is characteristic to the application server and is used for authentication of the application server;
 receiving an access token from the encrypted vault application, after authentication of the application server;
 provide the access token to the encrypted vault application to receive at least one encryption key therefrom; and
 communicating the at least one encryption key, via a key talker, to the database; and wherein the database comprises a key listener that listens for the at least one encryption key and provides the at least one encryption key to the database.

The present disclosure provides the aforementioned system and method for managing transparent data encryption of a database. The system of the present disclosure comprises an encrypted vault application, which requires plurality of administrator keys for unsealing, thereby ensuring that no one user can singularly open the encrypted vault application. Therefore, an attacker possessing a singular administrator key will not be able to open the encrypted vault application, as all the plurality of administrator keys are required simultaneously to unseal the encrypted vault application, thereby preventing a potential attack. Furthermore, the encryption key is never stored on the database or on the application server, which averts an attack in case the attacker accesses the database or the application server or both. Conventionally, the database would request at least one encryption key to access the database, making the request prone to interception by the attacker, and the attacker would latch on to the request in order to breach the database. Beneficially, in the present disclosure, the database listens for the encryption key instead of requesting the encryption key discreetly, thereby avoiding a potential attack.

Throughout the present disclosure, the term "database" as used herein relates to an organized body of digital information regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9. Moreover, upon start up, the database cannot read its data since the data is encrypted. The database requires at least one encryption key for decryption thereof.

The system comprises an encrypted vault application for storing at least one encryption key for the database, wherein the encrypted vault application requires a plurality of administrator keys for unsealing thereof. Herein, the encrypted vault application enables secure storage and tightly controls the at least one encryption key for protecting machines, applications and sensitive data. Particularly, the at least one encryption key is only saved in the encrypted vault application. Furthermore, the encrypted vault application helps secure sensitive data without exposing any of the at least one encryption key. Additionally, using the plurality of administrator keys ensures that no one user is able to singularly open the encrypted vault application to procure at least one encryption key for the database. Therefore, in case any attacker gets hold of a single administrator key, they will not be able to unseal the encrypted vault application, as the plurality of administrator keys is required simultaneously, thereby preventing a potential attack. Additionally, the term "at least one encryption key" refers to a random string of bits which are created with algorithms designed to ensure that each of the at least one encryption key is unique and unpredictable. Furthermore, the encryption key is not stored in a place, such as the database, where anyone may be able to access it. Furthermore, the database never requests the encryption key. Subsequently, the at least one encryption key is provided to access the encrypted data in the database. Herein, at all stages the encryption key is passed and never written on to a disk. Consequently, this helps to stop a man in the middle attack by an attacker who has only compromised the database. Herein, the man in the middle attack may happen when an application makes a connection to an application server without checking that it is indeed the application server it is supposed to connect to. Hence, the attacker will not be able to procure any at least one encryption key for unsealing the database. For the sake of brevity, hereinafter the term "man in the middle attack" is used interchangeably with the term "attack".

In an embodiment, the encrypted vault application is a Hashicorp Vault. Herein, the Hashicorp Vault provides a unified interface, while providing tight access control and recording a detailed audit log. Furthermore, the at least one encryption key is stored securely and available only when strictly necessary and the plurality of administrator keys are available to unseal the encrypted vault application.

In an embodiment, the plurality of administrator keys for unsealing of the encrypted vault application are shared using Shamir's Secret Sharing (SSS) algorithm. Herein, the SSS is a cryptographic algorithm that allows the plurality of administrator keys to be distributed securely amongst an untrusted network. Furthermore, the SSS works by splitting the plurality of administrator keys into smaller shares, wherein each individual share is unusable on its own. Thereby, the plurality of administrator keys are coupled and reconstructed, and the encrypted vault is unsealed. Furthermore, the encrypted vault application may be unsealed using a secure unsealing mechanism involving top senior executives and executive-level managers within an organization to unseal the encrypted vault application. Additionally, the encrypted vault application may be unsealed using another convenient and secure unsealing mechanism. Herein, the plurality of administrator keys is kept in Kubernetes Secrets. In particular, Kubernetes Secrets allow storing and managing sensitive information, for instance, passwords, plurality of administrator keys and so forth, and provide protection from unnecessary visibility that may make it vulnerable for attacks.

Throughout the present disclosure, the term "application server" refers to a software application specifically designed to run applications, for instance, web-based applications and so forth. Furthermore, the application server is hosted on a physical server, wherein the physical server is a piece of computer hardware that provides functionality for other programs or devices. Additionally, the application server provides processing power and memory to run applications, such as for example demanding web applications, in real-time. Notably, the application server is the main link between the encrypted vault application and the database. Beneficially, the application server may be a complex stack of different computational elements running specific tasks that need to work as one to power multiple clouds and web-based software and application. Subsequently, the application server is designed to install, operate and host applications and associated services for end users, IT services and organizations and facilitates the hosting and delivery of high-end consumer or business applications. Furthermore, the application server may also contain its own graphical user interfaces for management through personal computers, and may also take care of its own resources, as well as transaction processing, messaging, resource and connection pooling, and performing security tasks. Beneficially, the application server provides with an additional layer of security.

The system comprises the application server. Herein, the application server never holds any encryption key for the database, thereby preventing any attacks and data breaches. Subsequently, any attacker having compromised only the application server cannot get the at least one encryption key. Moreover, in case the application server tries to connect to the database, it is not able to connect since the database is sealed. Henceforth, any attacker having compromised both the application server and the database will still not be able to procure the encryption key, since the encryption key is never saved and is encrypted in transit.

The application server is configured to provide an authorization token to the encrypted vault application after unsealing of the encrypted vault application, wherein the authorization token is characteristic to the application server and is used for authentication of the application server. Herein, the encrypted vault application receives the authorization token from the application server to authorize access thereof to procure the access token from the encrypted vault application. Notably, the application server may also provide information relating to the database that it intends to access. Specifically, the encrypted vault application may store encryption keys for a plurality of databases. Therefore, the application server may provide along with the authorization token, information relating to the database (of the plurality of databases) that it wishes to access. It will be appreciated that the authorization token is characteristic to the application server and therefore, the encrypted vault application uses the authorization token to verify if the given application server requesting encryption key for a given database has rights to access the given database.

Optionally, the application server is configured to employ Kubernetes service account to authenticate the application server. Notably, the authorization token is a Kubernetes token. Furthermore, a Kubernetes service account is employed by the application server to interact with a Kubernetes cluster. Herein, to access the Kubernetes cluster, the user has to create a service account, that is a Kubernetes service account.

Subsequently, the Kubernetes service account generates a Kubernetes token, which is required by the application server to procure at least one encryption key from the encrypted vault application. Notably, Kubernetes service acts as a trusted third-party service and is configured to provide authorization tokens to application servers and the encrypted vault application. Subsequently, when the encrypted vault application receives a given authorization token from the application server, the encrypted vault application compares the authorization token received from the application server with the authorization token provided to it by the Kubernetes service. Beneficially, this is a secure Kubernetes procedure.

The application server is configured to receive an access token from the encrypted vault application, after authentication of the application server. Herein, the access token can be provided to a user and is used to access the database. Notably, the encrypted vault application is configured to provide at least one encryption key for the database, upon receiving the access token.

Optionally, the access token is time sensitive and is used only once to obtain the at least one encryption key from the encrypted vault application. Herein, in case the access token is available for an extended time and is not getting used in that extended time, then the access token risks getting unwanted attention from attackers, who might latch on to it to get to the at least one encryption key. Furthermore, using a particular access token multiple times enables the access token to be stored either by the application server or the encrypted vault application or both, making it easier for the attackers to detect the access token and use it for procuring the at least one encryption key and attack the database.

The application server is configured to provide the access token to the encrypted vault application to receive at least one encryption key therefrom. Typically, Transparent Data Encryption (TDE) is used to encrypt the entire database, which therefore involves encrypting data at rest, wherein "data at rest" refers to data that is currently unused. Furthermore, the TDE ensures that the data on the database is not read by attackers and prevents data breaches. Additionally, there may be plurality of encryption keys to access different data files in the database. Therefore, according to the authenticated access token, the necessary at least one encryption key is provided by the encrypted vault application, in order to access a particular data file from the database, thus avoiding a data breach. Furthermore, authentication of access tokens adds a layer of security. Typically, for authentication of access token, a service verifies the application server request. Herein, the service may be Amazon Web Services (AWS), Google Cloud Platform (GCP), Key Management Service (KMS) and so forth. Subsequently, the encrypted vault application can be unsealed automatically through the service. Furthermore, upon completion of the verification of the application server request, the application server issues the access token and responds to the application server request Optionally, the application server is configured to raise an alarm in an event of not receiving the at least one encryption key after providing the access token. Herein, the alarm may be a Short Message Service (SMS), phone, email, or any other means of communication, along with the compulsory involvement of a human. However, in case the time of procuring the encryption key from the encrypted vault application expires, a false alarm is raised. Furthermore, an alarm may be raised in case an attack occurs, and the attacker has stolen the access token in order to receive the encryption key to the database.

The application server is configured to communicate the at least one encryption key, via a key talker, to the database, wherein the database comprises a key listener that listens for the at least one encryption key. Essentially, the key listener waits for application server to provide the at least one encryption key. Herein, the application server requests the encryption key from the encrypted vault application, wherein upon receiving the encryption key, the application server immediately passes it to the key talker. Typically, neither the key listener nor the key talker holds the encryption key.

Optionally, the at least one encryption key is communicated and provided using Transport Layer Security (TSL). Herein, TSL is an encryption-based security protocol used for the purpose of ensuring privacy, authentication and data integrity for communication of the at least one encryption key from the application server to the database. Notably, the key talker tells the encryption key using secure sockets in the TSL to the database, wherein the database listens for the encryption key via the key listener. Conventionally, the database would request for at least one encryption key, thereby making it vulnerable to a possible attack, wherein the attackers can intercept the request and latch on to it in order to attack the database and commit a data breach. Therefore, the database listens for the encryption key via the key listener instead of requesting for it, essentially enabling the present disclosure as discreet as possible. Furthermore, traffic between the key talker and the key listener is encrypted.

The application server is configured to provide the at least one encryption key to the database. Herein, the key talker upon receiving the at least one encryption key, immediately connects to the key listener and sends the at least one encryption key to the key listener, wherein the at least one encryption key is encrypted in transit. Henceforth, the database is able to unseal the required data file and present it to the user who was given authorization to access the required data file from the database.

The present disclosure also related to the method as described above. Various embodiments and variants disclosed above apply mutatis mutandis to the method.

Optionally, the method comprises raising an alarm in an event of not receiving the at least one encryption key, at the application server, after providing the access token.

Optionally, the method comprises employing Kubernetes service account to authenticate the application server.

Optionally, in the method, the access token is time sensitive and is used only once to obtain the at least one encryption key from the encrypted vault application.

Optionally, the method comprises using Shamir's Secret Sharing (SSS) algorithm for sharing the plurality of administrator keys for unsealing of the encrypted vault application.

Optionally, the method comprises using Transport Layer Security (TSL) for communicating and providing the at least one encryption key.

DETAILED DESCRIPTION OF THE DRAWINGS

Referring to FIG. 1, illustrated is a block diagram depicting a network environment 100 in which a system 102 for managing transparent data encryption of a database 110 is implemented, in accordance with an embodiment of the present disclosure. The system 102 comprises an encrypted vault application 104 for storing at least one encryption key for the database 110. The encrypted vault application 104 requires a plurality of administrator keys 108 for unsealing thereof. The system 102 comprises an application server 106 configured to provide access token to the encrypted vault application 104 after unsealing of the encrypted vault application 104, wherein the access token is characteristic to the application server 106, receive at least one encryption key for the database 110 from the encrypted vault application 104 after authentication of the access token, communicate the at least one encryption key, via a key talker to the database 110, and provide at least one encryption key to the database 110.

Figure 2:
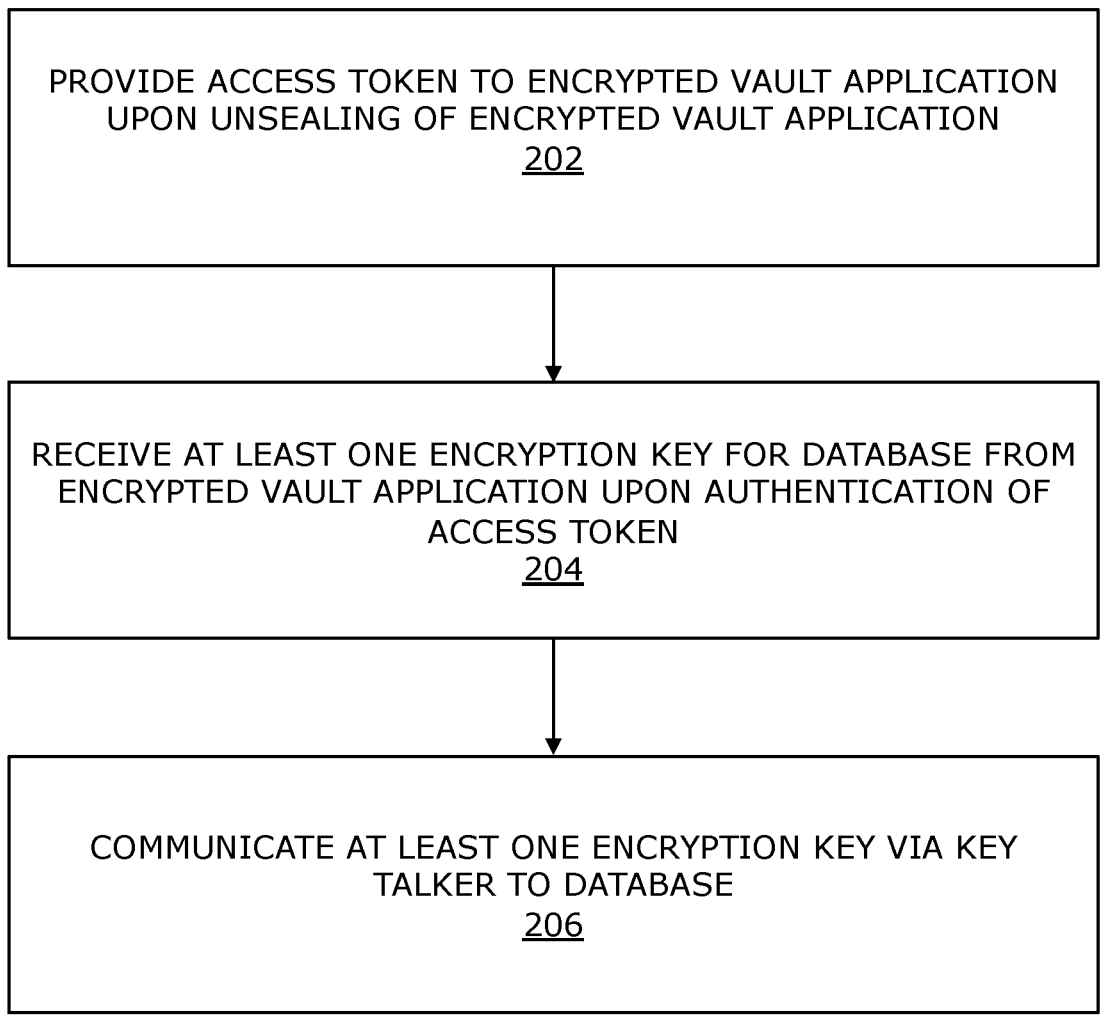
FIG. 2 is a flowchart depicting steps of method for managing transparent data encryption of a database, in accordance with an embodiment of the present disclosure.

Referring to FIG. 2, there is shown a flowchart depicting steps of method for managing transparent data encryption of a database, in accordance with an embodiment of the present disclosure. The method is implemented using a system (such as the system 102 of FIG. 1) comprising an encrypted vault application (such as the encrypted vault application 104 of FIG. 1) for storing at least one encryption key for the database, and an application server (such as the application server 106 of FIG. 1). The encrypted vault application requires a plurality of administrator keys for unsealing thereof. At step 202, an access token is provided to the encrypted vault application after unsealing of the encrypted vault application, wherein the access token is characteristic to the application server. At a step 204, at least one encryption key for the database is received from the encrypted vault application after authentication of the access token. At a step 206, at least one encryption key is communicated via a key talker to the database, wherein the database comprises a key listener that listens for at least one encryption key and provides the at least one encryption key to the database.

The steps 202, 204 and 206 are only illustrative and other alternatives can also be provided where one or more steps are added, one or more steps are removes, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for managing transparent data encryption of a database, the system comprising:
 a physical server:
 an application server comprising a graphical user interface, wherein
  the physical server is configured to host the application server, and
  the graphical user interface is configured to manage the physical server; and
 an encrypted vault application for storing at least one encryption key for the database, wherein the encrypted vault application requires a plurality of administrator keys for unsealing thereof, wherein the
 application server is configured to:
  provide an authorization token to the encrypted vault application after unsealing of the encrypted vault application, wherein the authorization token is characteristic to the application server and is used for authentication of the application server;
  receive an access token from the encrypted vault application, after authentication of the application server;
  provide the access token to the encrypted vault application to receive at least one encryption key therefrom;
  communicate the at least one encryption key, via a key talker, to the database; and
  raise an alarm in an event of not receiving the at least one encryption key after providing the access token,
  wherein the database comprises a key listener that listens for the at least one encryption key and provides the at least one encryption key to the database, wherein the key talker upon receiving the at least one encryption key, immediately connects to the key listener and sends the at least one encryption key to the key listener, and wherein the at least one encryption key is encrypted in transit.

2. The system of claim 1, wherein the application server is configured to employ Kubernetes service account to authenticate the application server.

3. The system of claim 1, wherein the access token is time sensitive and is used only once to obtain the at least one encryption key from the encrypted vault application.

4. The system of claim 1, wherein the encrypted vault application is a Hashicorp Vault.

5. The system of claim 1, wherein the plurality of administrator keys for unsealing of the encrypted vault application are shared using Shamir's Secret Sharing (SSS) algorithm.

6. The system of claim 1, wherein the at least one encryption key is communicated and provided using Transport Layer Security (TSL).

7. A method for managing transparent data encryption of a database, wherein the method is implemented using a system comprising:
 an encrypted vault application for storing at least one encryption key for the database, wherein the encrypted vault application requires a plurality of administrator keys for unsealing thereof; and
 an application server;
 wherein the method comprises:
  providing an authorization token to the encrypted vault application after unsealing of the encrypted vault application, wherein the authorization token is characteristic to the application server and is used for authentication of the application server;
  receiving an access token from the encrypted vault application, after authentication of the application server;
  providing the access token to the encrypted vault application to receive at least one encryption key therefrom;
  communicating the at least one encryption key, via a key talker, to the database; and
  raising an alarm in an event of not receiving the at least one encryption key, at the application server, after providing the access token,
 wherein the database comprises a key listener that listens for the at least one encryption key and provides the at least one encryption key to the database, wherein the key talker upon receiving the at least one encryption key, immediately connects to the key listener and sends the at least one encryption key to the key listener, and wherein the at least one encryption key is encrypted in transit.

8. The method of claim 7, wherein the method comprises employing Kubernetes service account to authenticate the application server.

9. The method of claim 7, wherein the access token is time sensitive and is used only once to obtain the at least one encryption key from the encrypted vault application.

10. The method of claim 7, wherein the method comprises using Shamir's Secret Sharing (SSS) algorithm for sharing the plurality of administrator keys for unsealing of the encrypted vault application.

11. The method of claim 7, wherein the method comprises using Transport Layer Security (TSL) for communicating and providing the at least one encryption key.

* * * * *